United States Patent
Vernooy

[15] 3,704,478
[45] Dec. 5, 1972

[54] PIPELINE PIG
[72] Inventor: Burton Vernooy, Tulsa, Okla.
[73] Assignee: T. D. Williamson, Inc., Tulsa, Okla.
[22] Filed: Feb. 25, 1971
[21] Appl. No.: 118,638

[52] U.S. Cl. ........................................15/104.06 R
[51] Int. Cl. .................................................B08b 9/04
[58] Field of Search .......15/104.06 R, 104.06 A, 3.5; 137/268, 802

[56] References Cited

UNITED STATES PATENTS

| | | | |
|---|---|---|---|
| 1,634,094 | 6/1927 | Cook et al. | 15/104.06 R |
| 1,713,895 | 5/1929 | Ford | 15/104.06 R |
| 2,326,528 | 8/1943 | Festervan et al. | 15/104.06 R UX |
| 3,074,436 | 1/1963 | En Dean | 15/104.06 R X |
| 3,496,588 | 2/1970 | Ver Nooy | 15/104.06 R |
| 3,538,531 | 11/1970 | Knapp et al. | 15/104.06 R |

FOREIGN PATENTS OR APPLICATIONS

| | | | |
|---|---|---|---|
| 522,895 | 4/1931 | Germany | 15/104.06 R |

Primary Examiner—Edward L. Roberts
Attorney—Hyer, Eickenroht, Thompson & Turner

[57] ABSTRACT

The pipeline pig disclosed includes a cup-shaped cleaning element having a spherically shaped outer surface with a diameter equal to or greater than the inside diameter of the pipeline for engaging a pipeline inner wall even as the pig passes through curved sections of the pipeline. The cleaning element has a plurality of grooves in its outer surface that provide a plurality of scraping edges to scrape rust, scale, and other substances from the inner wall of the pipeline.

2 Claims, 5 Drawing Figures

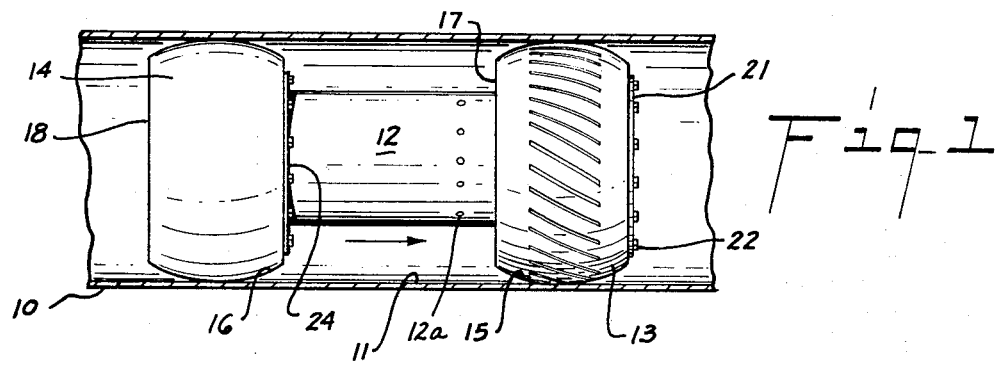
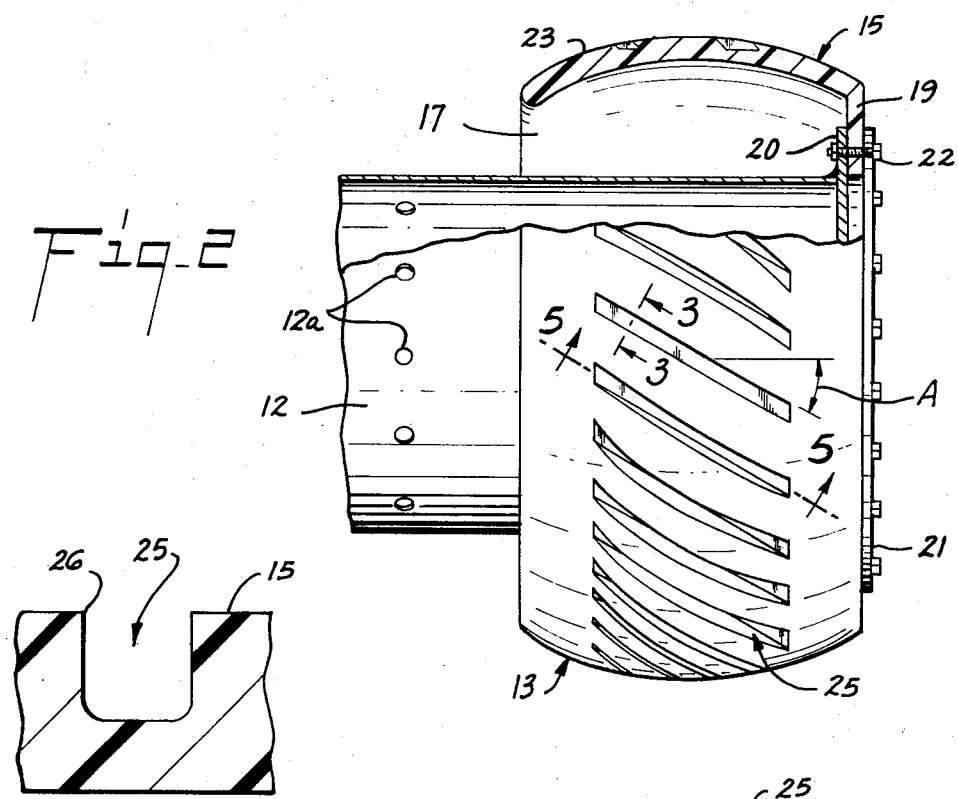
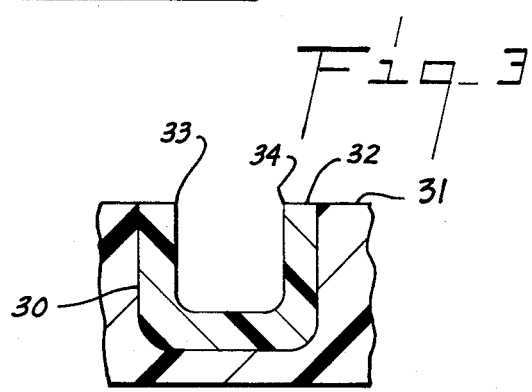
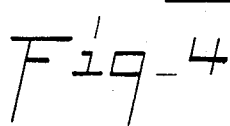
BURTON VerNooy
INVENTOR.

PIPELINE PIG

This invention relates to pipeline pigs for cleaning rust, scale, and other substances from a pipeline wall and to a cleaning element for such a pipeline pig.

Cleaning pigs have taken many shapes. Each one has one or more cleaning elements that engage and clean the inner wall of the pipeline. The most common cleaning element is a brush. On some pigs the brush is a wheel type, i.e., disc-shaped, so that one brush can engage the entire inner wall of the pipeline. On others, a plurality of individual brushes are mounted on springs and arranged to scrape the entire inner surface of the line. Other pigs use a plurality of spring-mounted scraping fingers instead of brushes. All such pigs include some means to cause the fluid flowing in the pipeline to move the pig through the line. Cup-shaped sealing elements are usually used for this purpose.

The brushes a plurality of individual bristles that are forced against the wall of the pipeline either because the diameter of the brush is greater than that of the pipeline, as in the wheel brushes, or by the force of the springs upon which they are mounted. The latter is also true of the scraping fingers. Each bristle of the brush and each scraping finger engage only a small portion of the total inner circumference of the pipe. The force with which each bristle of the spring-mounted brushes and each spring-mounted scraping finger engages the pipe depended on the force of the springs. In the case of the wheel-type brush, the force with which each bristle engage the pipe will vary with its length and position relative to the other bristles. Thus, the force with which each individual cleaning element engaged the pipe would and did vary, resulting in uneven wear on the cleaning elements and uneven cleaning of the pipe.

It is an object of this invention to provide a pipeline cleaning pig that includes a cleaning element having a plurality of scraping edges that are held against the inner wall of the pipe with a substantially uniform resilient force.

It is another object of this invention to provide a pipeline cleaning pig having a cleaning element that can serve as a propelling means as well as a cleaning means.

It is another object of this invention to provide a pipeline cleaning pig that has a cleaning element with a plurality of scraping edges that cannot gouge or score the inner wall of a pipeline, which is particularly advantageous when the pig is used in lines that are lined with plastic.

It is another object of this invention to provide a pipeline cleaning pig that includes a scraping means that will travel through a pipeline without becoming lodged in an opening in the pipeline wall.

It is another object of this invention to provide a pipeline cleaning pig with a cup-shaped cleaning element that has a spherically shaped outside surface with a plurality of grooves cut in the surface so that the edge of the grooves scrapes the wall as the pig travels through the pipeline.

It is a characteristic of cleaning pigs that they tend to cock as they are pushed through a pipeline. Usually, the back of the pigs tends to move up, which moves the front down. This causes uneven wear on both the cleaning elements and the sealing cups. It is another object and one of the features of this invention to provide a cleaning pig that will tend to rotate slowly around its longitudinal axis as it moves through a pipeline and thereby even the wear on the elements of the pig that engage the pipe.

These and other objects, advantages, and features of this invention will be apparent to those skilled in the art from a consideration of this specification, including the attached drawings and appended claims.

This invention will now be described in detail in connection with the attached drawings in which:

FIG. 1 is a side view in elevation of the preferred embodiment of the pipeline cleaning pig of this invention positioned in a pipeline;

FIG. 2 is a view partly in section and partly in elevation on an enlarged scale of the cleaning element of the pipeline pig of FIG. 1;

FIG. 3 is a cross-sectional view on an enlarged scale taken along line 3—3 of FIG. 2;

FIG. 4 is a cross-sectional view similar to FIG. 3 showing an alternate embodiment of the invention; and FIG. 5 is a longitudinal sectional view of a groove in the cleaning element taken along line 5—5 in FIG. 2.

The pipeline pig is shown in FIG. 1 positioned in pipeline 10 to scrape inner wall 11 of the pipeline, as the pig is moved through the pipeline. The pig includes body 12. Means are mounted on the body to cause the body to be moved through the pipeline by the fluid flowing in the pipeline and to scrape the inner wall of the pipeline as the body moves through the pipeline.

In the embodiment shown, the moving and scraping means includes elements 13 and 14, which are mounted in spaced relationship on body 12. Both elements have outer surfaces 15 and 16, respectively, that are spherical.

Both of elements 13 and 14 are cup-shaped having open ends 17 and 18, respectively, with the other ends adapted to facilitate mounting the elements on the body of the pig. Since both elements are mounted to the pig body in the same manner, only the mounting of element 13 will be described in detail. As shown in FIG. 2, the mounting end of element 13 includes inwardly extending mounting flange 19. The flange is attached to end plate 20 on body 12 by mounting ring 21 and bolts 22. Preferably, the bolts are tightened sufficiently to create a fluid-tight seal between mounting flange 19 of the element, which is made of a resilient elastomeric material, and end plate 20 and the bolts.

As stated above, elements 13 and 14 are made of a resilient elastomeric material. Preferably, the material has sufficient resiliency to allow the elements to be placed into a pipeline without damage even though the element, when relaxed, has a spherical diameter greater than the inside diameter of the pipeline. This arrangement insures that the spherical outer surface of the elements are held in contact with the inside of the pipeline by the resiliency of the material from which it is made. By making the elements cup-shaped, as shown, with one end free to move longitudinally, the inward movement of the walls of the element is facilitated. Further, being cup-shaped, if positioned so that the open free end of the elements face away from the direction of movement of the pig, the fluid pushing the pig through the line will also help hold the walls of the cup in engagement with the walls of the pipeline. By making the outer surface of the elements spherical, the surface will remain in contact with the pipe even as the elements move through curved sections of the line.

In the embodiment shown, the scraping means comprises a plurality of grooves 25 in surface 15 of element 13. The grooves are arranged so that a side edge of each groove will scrape a portion of the inner wall of the pipeline as the pig moves through the pipeline. In the embodiment shown, grooves 25 are parallel and equally spaced around outer surface 15. The grooves are at an angle, angle A, to the direction of travel of the pig. This locates the side edges of the grooves transverse the direction of travel so that the trailing edge of each groove, edge 26, when the pig moves in the direction indicated in FIG. 1, will tend to scrape the inner wall of the line. The number of grooves in the spherical surface, the length of the grooves, and the spacing between the groove may vary, as long as the grooves provide scraping edges that clean the inner pipeline wall both in straight and curved sections of the pipeline. Also, as will be seen from the drawings, the leading end of each groove transversely overlaps at least a portion of the length of an adjacent groove at its trailing end. In the preferred embodiment, angle A between the grooves and the direction of pig travel is 30°. The force of the scraping action acting on the scraping edges of the grooves, since it acts at an angle to the direction of travel of the pig, will tend to cause the pig to rotate slightly as it travels through the pipeline. Rotation of the pig evens the wear on the elements, for as explained above, as the fluid pushes the pig through the line, the pig will tend to cock in the line increasing the wear at the bottom of the leading element and the top of the trailing element.

Frequently, when running a cleaning pig, it is desirable to allow some of the propelling fluid to bypass the pig to carry the scraped-off debris, etc., on ahead of the pig. In the pig shown, the grooves provide channels through which such bypass fluid can pass by element 13. Preferably, the bypass fluid is directed through the grooves, since it tends to keep them clean. Usually, the fluid is allowed to bypass the pig through openings that are variable in size. These would normally be located in the end plate (not shown) to which element 14 is mounted. The fluid then flows into the space between the elements through openings 12a in body 12.

In the embodiment shown then, element 14 serves primarily as the pig propelling means, whereas element 13 serves primarily as the scraping means. In some applications, particularly where the force required to move the pig is not great, both cup-shaped elements can be grooved so that both can scrape and propel the pig.

As stated above, the elements should be made of a resilient material. This material should also be rigid enough for edges 26 to do an adequate job of scraping the pipe. One such material that has been found satisfactory is polyurethane. This material can be cast. Its hardness can also be varied. In the preferred embodiment, the elements are made of polyurethane plastic having a durometer hardness of approximately 75 to 84 Shore A. The grooves in cleaning element 13 may be formed by machining the finished cast element, or the grooves may be formed during the casting process. As shown in FIG. 5, the bottoms of the grooves are flat and generally parallel to the longitudinal axis of the pig.

FIG. 4 illustrates an alternate embodiment of the invention. As shown, groove 30, which is one of a plurality in element 31, is lined by member 32. This member is U-shaped in cross section to provide side edges 33 and 34, one of which will scrape the inside of a pipeline in the manner described above in connection with edges 26 of grooves 25. This embodiment allows the element to be made of a material having the desired resilient properties, while the scraping edges are provided by a member made of a material having the desired scraping properties. They can be the same material. For example, the element can be made of a polyurethane having a durometer of 75 to 84 Shore A, while the liner is made of a polyurethane having a durometer of approximately 74 Shore D. The liner members can be attached to the element in any convenient manner.

From the foregoing, it can be seen that this invention is one well adapted to attain all of the ends and objects hereinabove set forth, together with other advantages that are obvious and that are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipeline pig for scraping the inner wall of a pipeline as the pig is moved through the pipeline by fluid flowing therein, comprising a body and means mounted on the body to cause the body to be moved through a pipeline by the fluid flowing through the pipeline and to scrape the inner wall of the pipeline as the body moves through the pipeline, said scraping means including a cleaning element made of polyurethane and having an outer surface that is adapted to engage the inner wall of a pipeline and also having a plurality of first grooves in said outer surface, and a member of wear-resistant material located in each of said first grooves with each member having a second groove therein located for a side edge of the second groove to scrape the inside wall of a pipeline as the pig is moved through a pipeline by fluid flowing therein.

2. A pipeline pig for scraping the inner wall of a pipeline as the pig is moved through the pipeline by fluid flowing therethrough comprising: a body, means on the body for supporting it in a pipeline and for impeding flow past the pig so that fluid flowing through a pipeline propels the pig therealong, said means including at least one pig cup of a resilient material and having an outer circumferential surface that has a diameter at least as great as the inner diameter of a pipeline through which the pig is to move so that the outer surface of the cup will maintain contact with the inside wall of a pipeline when traversing curved portions of the pipeline; said outer surface of said cup having a plurality of grooves therein about its circumference with the grooves being shaped to provide an elongate scraping edge and located so that each groove will scrape a portion of the inner wall of a pipeline as the pig moves through a pipeline; the number, length and spacing of said grooves being selected so that the grooves provide scraping edges for cleaning both curved and straight sections of a pipeline with the leading end of each groove transversely overlapping at least a portion of the length of an adjacent groove at the latter's trailing end; said pig cup being hollow and having an opening permitting pipeline fluid to flow into its interior.

* * * * *